United States Patent
Lerman et al.

(10) Patent No.: US 6,282,207 B1
(45) Date of Patent: Aug. 28, 2001

(54) METHOD AND APPARATUS FOR STORING AND ACCESSING MULTIPLE CONSTANT BIT RATE DATA

(75) Inventors: Jesse S. Lerman, Kendall Park; Danny Chin, Princeton Junction, both of NJ (US)

(73) Assignee: Diva Systems Corporation, Redwood City, CA (US)

(*) Notice: Subject to any disclaimer, the term of this patent is extended or adjusted under 35 U.S.C. 154(b) by 0 days.

(21) Appl. No.: 09/458,337

(22) Filed: Dec. 10, 1999

Related U.S. Application Data

(60) Provisional application No. 60/126,836, filed on Mar. 30, 1999.

(51) Int. Cl.[7] ............................................. H04J 3/06
(52) U.S. Cl. ................................................ 370/470
(58) Field of Search ................................. 370/470, 465, 370/503, 389, 261, 264, 229, 428, 442, 347, 537, 535, 528, 524, 523, 508, 506, 502, 476; 710/260; 709/204, 247, 202, 227; 348/348.1, 390.1, 441

(56) References Cited

U.S. PATENT DOCUMENTS

| | | | |
|---|---|---|---|
| 5,493,568 | * | 2/1996 | Sampat et al. ................. 370/264 |
| 5,506,832 | * | 4/1996 | Arshi et al. .................... 370/241 |
| 5,913,026 | | 6/1999 | Bleidt et al. ................. 395/200.31 |

* cited by examiner

*Primary Examiner*—Dang Ton
(74) *Attorney, Agent, or Firm*—Thomason, Moser & Patterson LLP

(57) ABSTRACT

A method of defining extent for storing a plurality data streams having different bit rates. The method calculates the size of the extent for a given data stream then periodically inserts at least one null packet into the extents to enable any bit rate to be able to be stored using a fixed extent size for the stream.

21 Claims, 3 Drawing Sheets

METHOD AND APPARATUS FOR STORING AND ACCESSING MULTIPLE CONSTANT BIT RATE DATA

CROSS-REFERENCE TO RELATED APPLICATION

This invention claims benefit of U.S. Provisional Patent Application Ser. No. 60/126,836 filed Mar. 30, 1999 and incorporated herein by reference in its entirety.

BACKGROUND OF THE INVENTION

1. Field of the Invention

The invention relates to electronic data storage and access. More particularly, the invention relates to a method and apparatus for storing and retrieving multiple electronic data streams having different bit rates.

2. Description of the Background Art

Multimedia systems store and retrieve video, audio and other content from mass storage devices, e.g., disk drive arrays. One such system provides video-on-demand (VOD) to an end user. Such a VOD system stores video content in memory and retrieves the content upon demand. The VOD system then serves the video content to the end user requesting the video content.

The VOD system uses a VOD server for storing and accessing video content or a plurality of video files. The VOD server processes the video content as data packets and stores the video content into extents or logical memory blocks within a memory. The data packets generally comply with one or more of the Moving Pictures Experts Group (MPEG) standards. To store these data packets in a redundant manner, the VOD server may stripe the video content over an array of disks within the memory. Each video file may occupy several physical disk blocks or disk tracks within the disk drives.

Multimedia programs are encoded using various resolutions of encoding depending upon the content of the program, i.e., sporting events are encoded with higher resolution than situation comedies. The bit rate of high-resolution encoded program is greater than a bit rate of a low-resolution encoded program. As such, for a given unit of program time, a high resolution encoded program generates more packets than are generated when forming a low resolution encoded program. Consequently, a video server must be able to store a plurality of programs having constant bit rates. To facilitate storage of multiple constant bit rate programs, current servers require the bit rates of various programs to be integer multiple of one another such that the extents of any given program are of equal size and the extents across programs are integer multiples of each other. Such a restrictive storage system is not flexible in providing storage of any form of programming, i.e., programs having non-integer bit rates. Consequently, current video servers do not store programming in an optimal manner.

Therefore, there is a need in the art for an improved method and apparatus for storing an accessing multiple constant bit rate video programs wherein the bit rate of programming can be arbitrary.

SUMMARY OF THE INVENTION

The invention overcomes the disadvantages associated with the prior art by a method and apparatus for defining constant time length (CTL) extents to store packetized video streams having multiple constant bit rates (MCBR), i.e., each stream has a constant bit rate within the stream, but different as compared to other streams. Specifically, the method analyses the bit rate of a given stream and determines an appropriate length for a CTL extent within which to store data packets that comprise the stream. The extent is a number of bits that can be read from memory during a data read period for a given bit rate, rounded up to the next full packet. The method then stores the extents and pads some extents with a null packet, as needed, to compensate for accumulated partial packets of data. The null packets are referred to as dither null packets to differentiate them from the null packets that appear in a standard encoded video bitstream. Consequently, any bit rate stream can be stored in this manner with a minimum utilization of dither null packets. The extents are stored by striping them onto a disk array, i.e., one extent per disk drive, then wrapping from the last drive in the array to the first. The method repeats for each data stream such that a plurality of constant bit rate streams are stored.

To read the data from the array, the extents are recalled one at a time and temporarily stored in a buffer memory. A data pointer is used to access the packets from the buffer. The dither null packets are skipped such that the output stream of packets does not contain dither null packets. The packets are coupled to a multiplexer. The multiplexer combines the packets into a transport stream to deliver the packets of video data to a downstream user.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
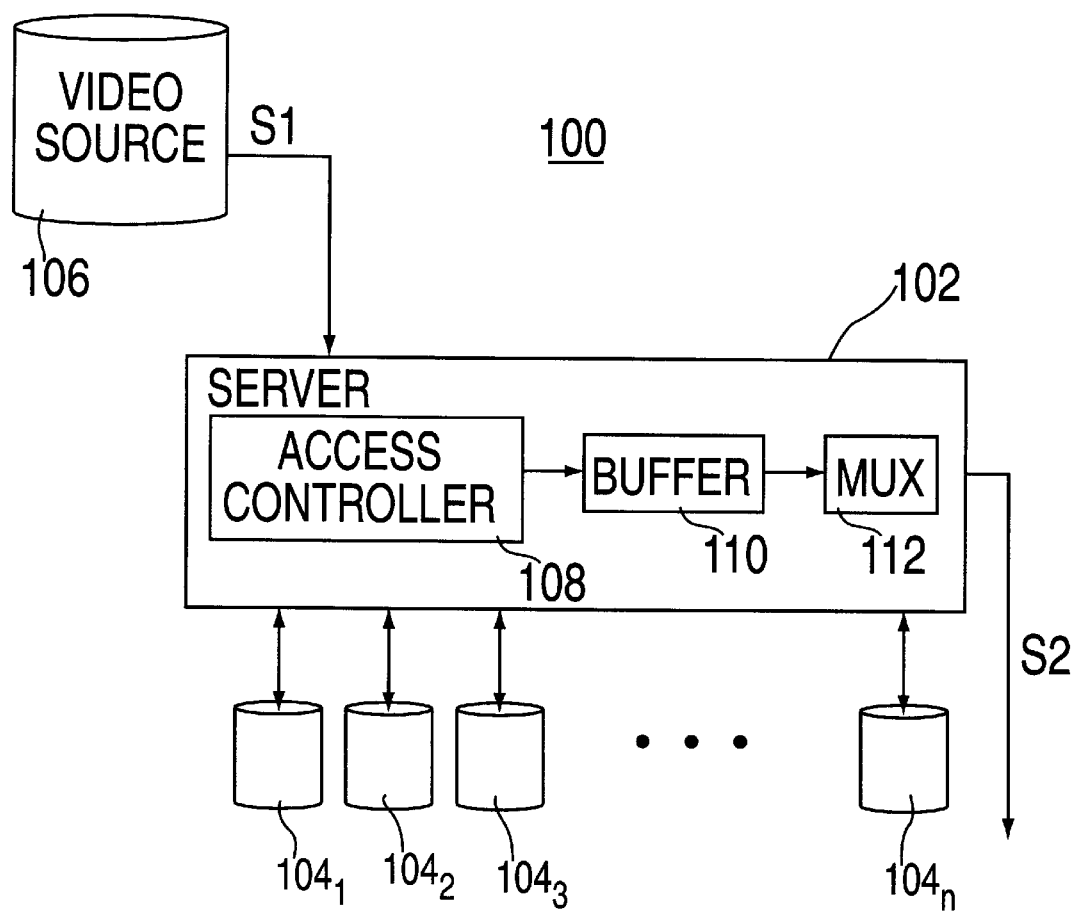
FIG. 1 shows a high level block diagram of a system for storing and retrieving data.

FIG. 1 depicts a high level block diagram of a video server system 100 for storing and retrieving data. The system 100 of FIG. 1 finds great utility in, e.g., a video of demand (VOD) system, as described in U.S. patent application Ser. No. 08/984,710, filed Dec. 3, 1997 and incorporated herein by reference. The system 100 comprises a server 102 and an array of storage disks $104_1$, $104_2$ . . . $104_n$, where n is an integer equal to the number of storage disks in an array used to store and retrieve data. The server 102 comprises an access controller 108, a data buffer 110, and a multiplexer (MUX) 112. Other components and features of the system 100 not essential to the invention are not discussed herein.

In operation of the system 100, the server 102 receives a data stream or video file from a video source 106 via signal path S1. The data stream is typically video content, such as a movie or live broadcast, in the form of an encoded and/or compressed bitstream using, illustratively, the MPEG-2 standard. The data stream is generally a sequence of data packets. The packets may be standard MPEG packets or they may be special transport packets such as those described in U.S. patent application Ser. No. 09/458,339, filed Dec. 10, 1999, and is incorporated herein by reference.

The packets are organized into groups to facilitate storage. The groups of packets are known as extents. The video source 106 generally provides a plurality of constant bit rate video programs, i.e., MPEG bitstreams, having arbitrary bit rates. Each program may have a different bit rate as compared to other programs such that programs of various video resolution are made available to a viewer. Thus, for a given length of programming time, more or less packets represent each program depending upon the encoding parameters used to produce the encoded program.

The server 102 stores the data stream in a memory comprising an array of disks $104_1, 104_2 \ldots 104_n$ or some storage medium. The array of disks $104_1, 104_2 \ldots 104_n$ may be arranged in a Redundant Array of Independent Disks (RAID) configuration as discussed in The RAIDbook: A Source Book for Disk Array Technology, Fourth Edition (1995). Each disk $104_1, 104_2 \ldots 10^n$ in the array stores data as extents.

The server 102 stripes the data into array of disks $104_1, 104_2 \ldots 104_n$ illustratively in the manner shown in U.S. Pat. No. 5,920,702, issued Jul. 6, 1999 and incorporated herein by reference. The size of the extent is a constant time length (CTL) extent, where the extent represents a fixed period of programming time, i.e., a fixed number of encoded video frames. Each extent may store a plurality of data packets that represent video content and a null packet, as needed. The use of null packets shall be described below.

When a user requests to view a particular video or data stream, the video session manager (not shown) of the system 100 sends a control or enable signal to the server 102. In response to this signal, the access controller 108 of the server 102 retrieves the extents for the requested program from the array of disks $104_1, 104_2 \ldots 104_n$. The server 102 then buffers the retrieved program in buffer 110 and, using MUX 112, combines the packets of the retrieved program with those of other programs to form a transport stream on signal path S2. The transport stream is coupled to a network and sent downstream to a user set top terminal for viewing.

Figure 2:
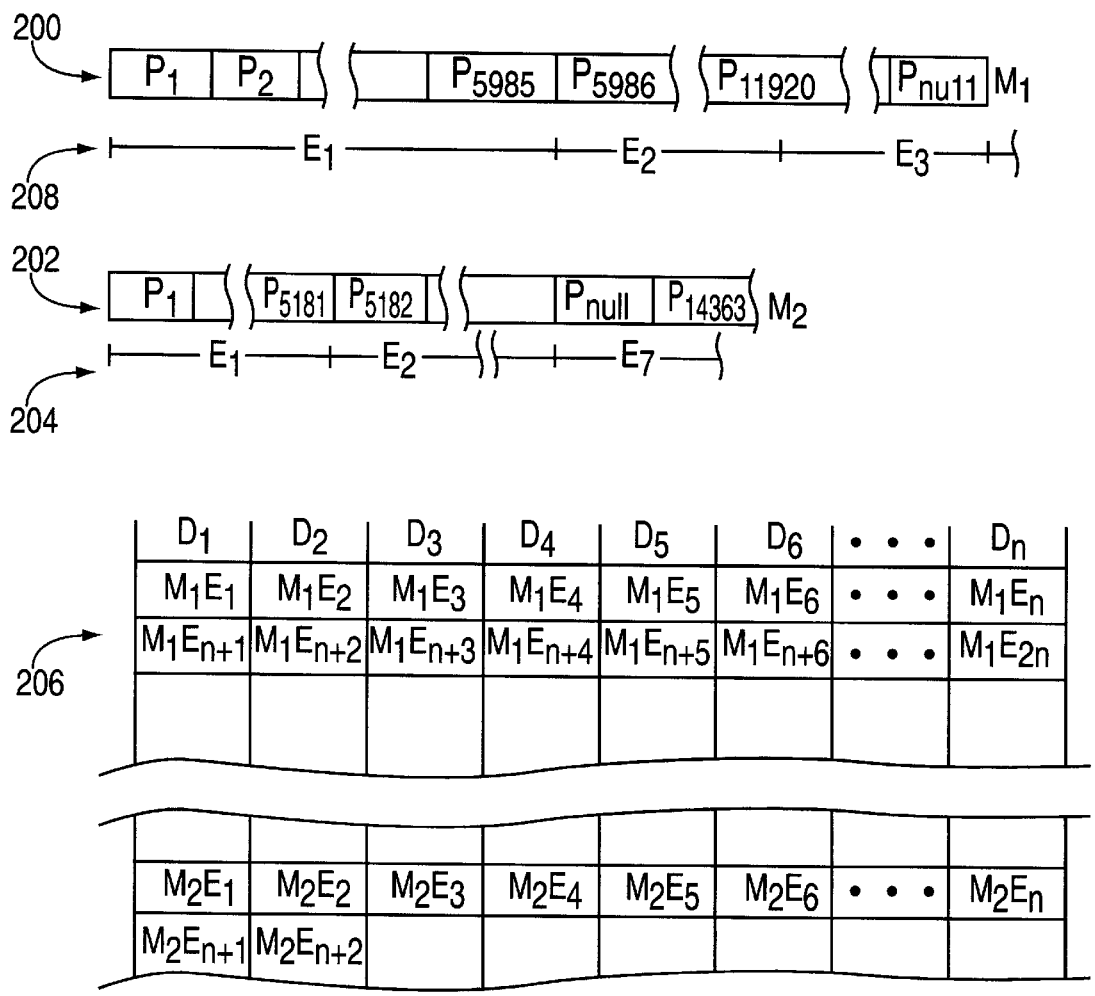
FIG. 2 shows process for storing MCBR data streams.

FIG. 2 diagrammatically depicts the process used to store multimedia programming on the disk array 104 of FIG. 1. For simplicity two encoded movies 200 and 202 are shown having bit rates $b_1$ and $b_2$, where $b_2$ is greater than $b_1$ and both bit rates are arbitrary.

The process first computes an extent size for each movie. The extent size in equal to the bit rate of the movie times the service interval over which the extent will be read from the disk drive. For example, if the bit rate for movie 1 ($M_1$) is 5 Mbps and the service period is 1.8 seconds, then the extent size will be 5984.04 packets (assuming 188 byte MPEG packets are used to carry the data). Since partial packets can not be stored, i.e., cannot be divided over two extents, the process rounds up to the next full packet. Additionally, rounding up ensures that a data underflow condition will not occur at the decoder, i.e., more data is being supplied per service interval than is necessary. As such, in this example, the extent size is 5985 packets.

As movie 1 is stored in these 5985 packet long extents, a fractional packet accumulation occurs that, if not compensated for, would add substantial amount of buffer memory needed to process a movie within a decoder. In the example and as shown at reference number 208, a 0.96 fraction of a packet is accumulated with each extent such that after 2 extents more than full packet of accumulation occurs, i.e., 1.92 packets. To minimize the size of the buffer memory in the server, the invention compensates for the accumulation by making the $5986^{th}$ packet a null packet after a full packet of accumulation occurs. Without such null packet utilization, the buffer memory would accumulate a substantial number of packets, since the access controller would be providing more packets than are sent to users. In this example, after 2 extents have been stored, the 3rd extent ($E_3$) contains a null packet ($P_{null}$). The null packet used for accumulation compensation is referred to as a dither null packet to differentiate the packet from a standard null packet that may appear in an MPEG stream.

The access controller maintains a sum of the fractional packet accumulation. As such, a fractional packet accumulation value is computed and, when a null packet is used, one packet is subtracted from the accumulation value and the remainder is used as the accumulation value to which additional fractional packet values are added. In the example above, the first extent fractional value is 0.96 and the accumulated value after the second extent is 1.92 (i.e., 0.96 plus 0.96). Then, one dither null packet is used and the accumulation value falls to 0.92, but the third packet adds a 0.96 fractional packet to the accumulation value causing the accumulation value to rise to 1.88. As such, the fourth extent will contain a dither null packet. This process is repeated until the entire movie is stored in memory.

The present invention typically stores packets that have a header in which a special code is used to identify a dither null packet. This code is used to ensure that the dither null packets are removed from the data before the data is sent to a user. Sending such null packets would use bandwidth in the transmission channel for no reason. The removal of dither null packets is described below.

These extents are striped onto the disk array as shown in striping map 206, where movie 1, extent 1 ($M_1E_1$) is stored on disk drive 1 ($D_1$), then $M_1E_2$ is stored on $D_2$ and so on.

If, for example and as shown at 202, the bit rate for movie 2 ($M_2$) is 6 Mbps and the service period is 1.8 seconds, then the extent size will be 7180.85 packets (assuming 188 byte MPEG packets are used to carry the data). The process rounds up to the next full packet, to an extent size is 7181 packets. As movie 2 is stored in these 7181 packet long extents, the fractional packet accumulation is a 0.15 fraction of a packet for each extent such that after 6 extents a full packet of accumulation occurs. The invention, as shown at 204, compensates for the fractional packet accumulation by using a dither null packet after a full packet of accumulation occurs. In this example, after 6 extents have been stored, the 7th extent ($E_7$) uses a dither null packet ($P_{null}$). The extents for movie 2 are stored on the disk drive array as shown in the striping map 206.

Using null packets in this manner, any arbitrary bit rate packet stream can be easily stored and the server uses a minimal sized buffer.

Returning to FIG. 1, upon a request for delivery of programming to a user, the program extents are recalled from the disk drives by the access controller 108. The extents are buffered in buffer 110. Since the server is simultaneously processing and fulfilling request form many users, the access controller interleaves the extent accesses of the various requested movies. Although the extents for a requested movie are generally accessed sequentially, they are not accessed contiguously. As such, a given movie's extents are placed in the buffer interspersed with other movie's extents. In fact, to minimize buffer size, an extent for a given movie is not added to the buffer until the previous extent has been read out of the buffer and sent to the user.

As the extents are stored in the buffer 110, the access controller monitors the packet headers within the extents to detect dither null packets. Once identified, the pointer that is used to access the packets for transfer to the multiplexer 112 is instructed to skip the dither null packets. As such, the dither null packets are not transferred to the multiplexer 112.

The multiplexer 112 is provided the buffered packets as needed to maintain a steady video signal at a user's television. The individual packets from the buffer 110 are positioned into a transport stream along with packets of many other programs. The transport stream is transmitted along with as many as 270 other streams through a 1 G bps fiber optic channel to the user. The user's equipment extracts from the transport stream the packets associated with the requested program, decodes the packets, and displays the program.

Figure 3:
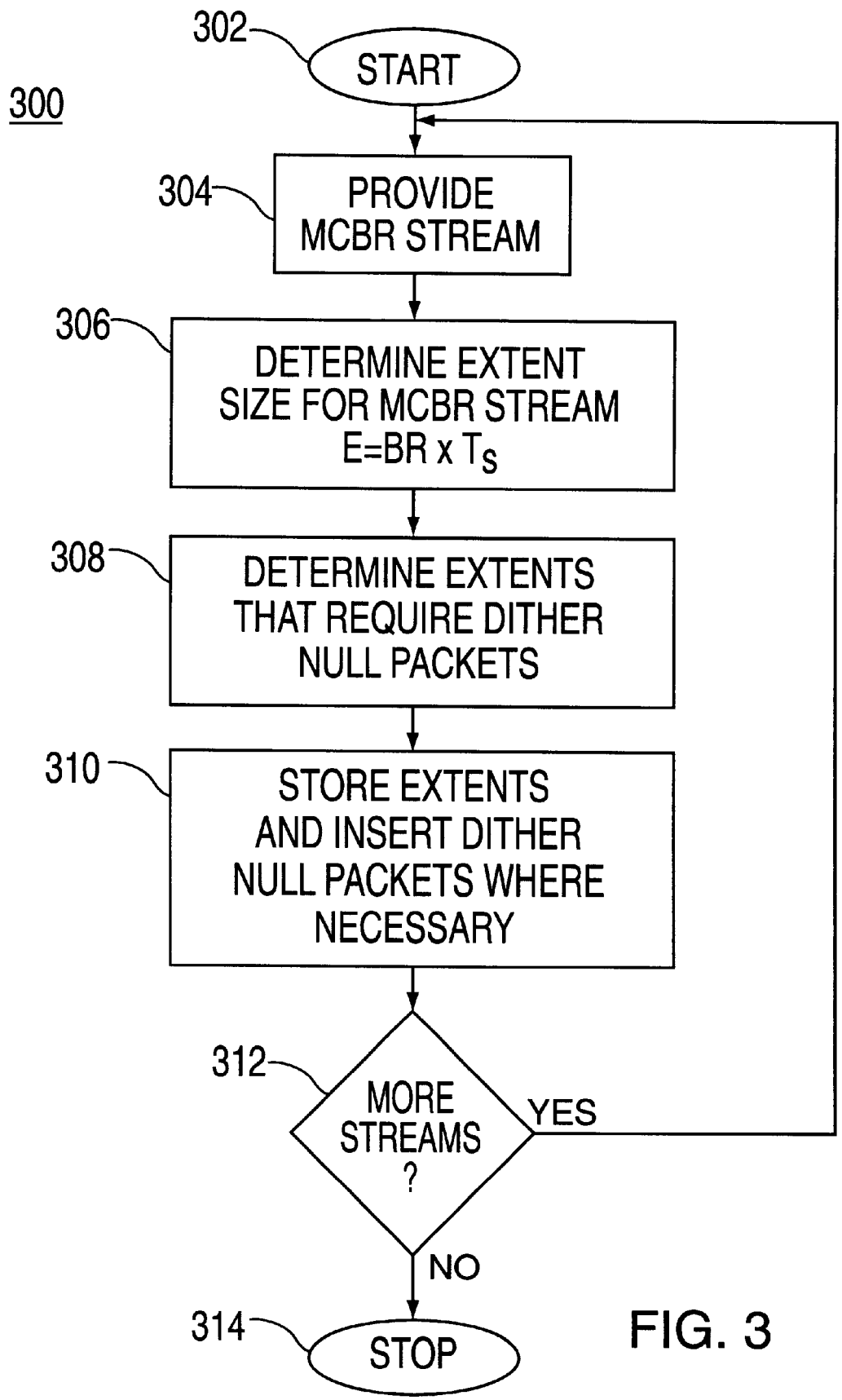
FIG. 3 shows a flow diagram of a routine for storing multiple constant bit rate (MCBR) data streams into memory.

FIG. 3 shows a flow diagram of a routine 300 for storing multiple constant bit rate (MCBR) data streams into a memory. The routine 300 begins with a start signal at step 302. The routine 300 then proceeds to step 304 to determine the extent size to use for the MCBR stream. As discussed above, the extent size (E) is the bit rate (BR) of the stream times the service interval ($T_s$) (i.e., the time required to read an extent from a disk drive to fulfill a user request).

The routine 300 then proceeds to step 308 to determine which of the extents will receive a dither null packet. The process maintains an accumulation value, as described above. This accumulation value is the sum of the fractional packet value that is contained in each extent. When the accumulation value reaches a value that is greater than or equal to one, a dither null packet is used. This reduces the accumulation value by one and the remainder is then used as the accumulation value to which the following extent's fractional value is added. Thus, step 308 uses the accumulation value to determine which of the extents will contain a dither null packet used At step 310, the server 102 stores the data stream into the extents as defined in step 306 and inserts dither null packets in the extents as determined in step 308. The extents are striped across the array as discussed with respect to FIG. 2.

After storing the extents, the routine 300 proceeds to step 312 to determine whether there are any more data streams to be stored. If there is additional data to receive, then the routine 300 returns to step 304 to receive and store an additional data stream. If there is no additional data to receive, then the routine 300 proceeds to step 314 to stop the storage of MCBR data streams.

The numerical values used herein in FIGS. 1 to 3 are illustrative and are not intended as limiting the invention. As such, other values and standards may be used without affecting the scope of the invention.

Although various embodiments which incorporate the teachings of the present invention have been shown and described in detail herein, those skilled in the art can readily devise many other varied embodiments that still incorporate these teachings.

What is claimed is:

1. A method for storing data in a memory comprising the steps of:
   computing an extent size from a bit rate of a data stream;
   rounding the computed extent size up to the next whole packet of data;
   identifying extents that require a null packet to be added to the extent;
   inserting the null packet into the identified extents; and
   storing each extent in said memory.

2. The method of claim 1 wherein said memory is a disk drive array comprising a plurality of disk drives.

3. The method of claim 2 wherein said storing step further comprises the step of:
   striping the extents across said disk drive array.

4. The method of claim 1 wherein the memory stores a plurality of packetized data streams where each data stream has a different bit rate.

5. The method of claim 1 wherein the packetized data stream comprising packets of encoded video information.

6. The method of claim 1 wherein said computing step comprises the step of:
   computing the extent size by multiplying a bit rate times a service interval.

7. A method for storing and accessing data in a memory comprising the steps of:
   determining a bit rate for a packetized data stream;
   computing, in response to the bit rate, an extent size;
   selecting groups of packets within said packetized data stream and a null packet, when needed, to define each extent;
   storing each extent in said memory;
   retrieving, upon request for a packetized data stream, an extent from said requested stream;
   storing a retrieved extent in a buffer memory;
   retrieving packets of data, as needed, from said buffer to create a transport stream.

8. The method of claim 7 further comprising the step of timing said retrieval of each packet to ensure that a user receives a steady flow of packets from said packetized data stream.

9. The method of claim 7 further comprising the step of analyzing each extent to identify null packets.

10. The method of claim 9 further comprising the step of skipping retrieving said identified null packets as said packets of data are retrieved from said buffer.

11. The method of claim 7 wherein said memory is a disk drive array comprising a plurality of disk drives.

12. The method of claim 11 wherein said storing step further comprises the step of:
    striping the extents across said disk drive array.

13. The method of claim 7 wherein the memory stores a plurality of packetized data streams where each data stream has a different bit rate.

14. The method of claim 7 wherein the packetized data stream comprising packets of encoded video information.

15. The method of claim 7 wherein each data stream comprises an encoded bitstream video.

16. The method of claim 7 wherein said portion retrieval step removes any null packets from said portion of the extent.

17. Apparatus for storing data in a memory comprising:
    means for determining a bit rate for a packetized data stream;
    means for computing, in response to the bit rate, an extent size;
    means for selecting groups of packets within said packetized data stream and at least one null packet, when needed, to define each extent; and
    a memory for storing each extent.

18. The apparatus of claim 17 wherein said memory is a disk drive array comprising a plurality of disk drives.

19. The apparatus of claim 18 wherein the extents are striped across said disk drive array.

20. The apparatus of claim 17 wherein the memory stores a plurality of packetized data streams where each data stream has a different bit rate.

21. The apparatus of claim 17 wherein the packetized data stream comprising packets of encoded video information.

* * * * *